No. 714,786. Patented Dec. 2, 1902.
M. W. DAY.
CONTROLLING ELECTRIC MOTORS.
(Application filed Sept. 26, 1900.)
(No Model.) 2 Sheets—Sheet 2.
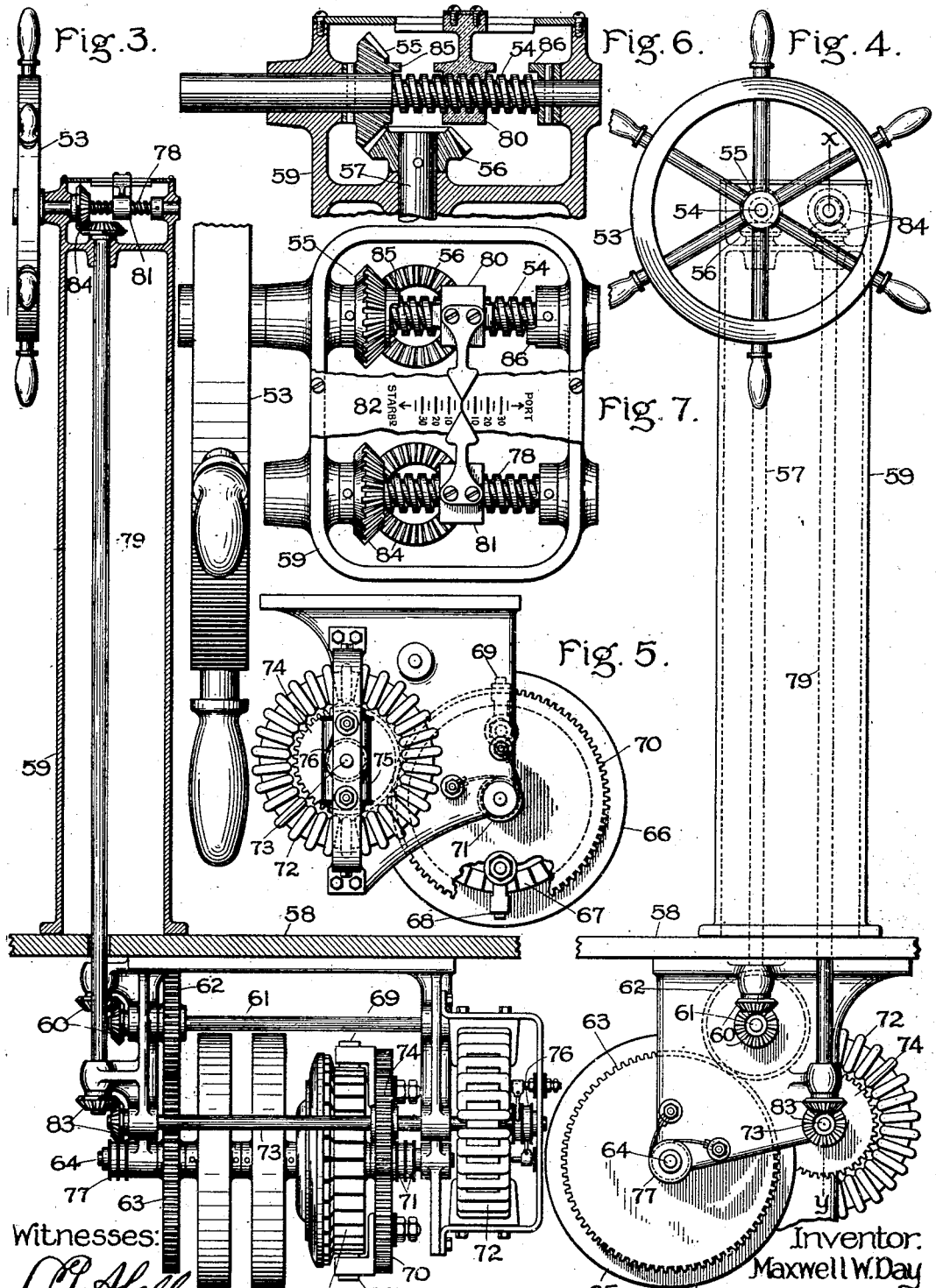

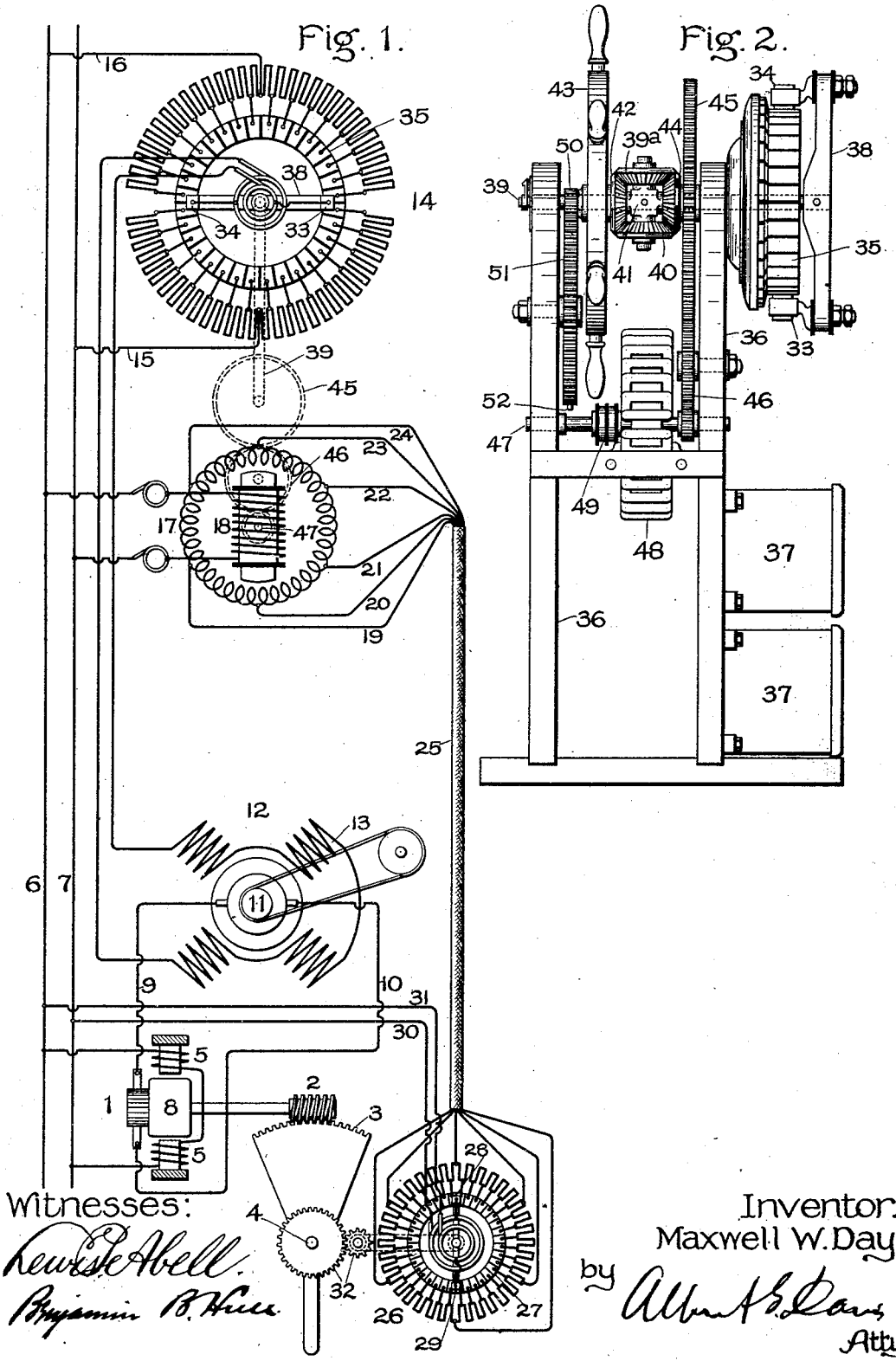

UNITED STATES PATENT OFFICE.

MAXWELL W. DAY, OF SCHENECTADY, NEW YORK, ASSIGNOR TO GENERAL ELECTRIC COMPANY, A CORPORATION OF NEW YORK.

CONTROLLING ELECTRIC MOTOR.

SPECIFICATION forming part of Letters Patent No. 714,786, dated December 2, 1902.

Application filed September 26, 1900. Serial No. 31,132. (No model.)

*To all whom it may concern:*

Be it known that I, MAXWELL W. DAY, a citizen of the United States, residing at Schenectady, county of Schenectady, State of New York, have invented certain new and useful Improvements in Controlling Electric Motors, (Case No. 1,215,) of which the following is a specification.

My present invention relates to means for controlling electric motors from a distance, and comprises certain improvements of particular value for use in connection with the steering of ships, the value of these improvements being, however, not limited to the particular application of the same mentioned.

The invention comprises certain arrangements of apparatus and of electric circuits, together with certain details of construction, all of which will be set forth with particularity in the following description and accompanying drawings, the features of novelty being pointed out in the appended claims.

In the drawings, Figure 1 represents a diagram of a system of motor control arranged in accordance with my invention. Fig. 2 is an end elevation of a transmitting apparatus forming part of my motor-control system. Figs. 3 and 4 are views of a modified form of transmitting apparatus, while Figs. 5, 6, and 7 are detail views of said modified form of transmitting apparatus.

The broad features of the motor-control system may be best understood by referring first to Fig. 1. In the system there represented the rudder-actuating mechanism used for ship-steering purposes consists of a motor 1, having its shaft geared by means of a worm 2 with a coöperating worm-gear 3, attached to the shaft 4, connected to the rudder. This motor 1 has its field-winding 5 constantly excited from a source of constant potential—such, for example, as the mains 6 7, leading to the electric-power-generating system of the ship. The speed of the motor, as well as its torque, is varied by varying the electromotive force impressed upon its armature, the requisite variations of electromotive force being obtained by supplying the armature from a direct-current generator, the voltage of which is varied by varying its field excitation. This variation of field excitation is effected by means of a rheostat forming a part of the transmitting apparatus of the system and to which motion is communicated by the helmsman or other operator. The armature of the motor 1 is indicated at 8, and its terminals are connected to suitable leads 9 and 10, extending from the armature 11 of the power-driven generator 12. The field of this generator is represented at 13, the current for exciting the field being derived from the ship's mains 6 7 and regulated by means of a rheostat 14 under the control of the helmsman. When the rudder-actuating motor has been started into operation, a certain means is provided for progressively shutting off or tending to shut off the current supplied to the field of the generator 12, and consequently the current supplied to the armature of the rudder-actuating motor. This means consists of a synchronous electrical transmission device, which acts to move one member of the controlling-rheostat in a reverse direction in synchronism with the movements of the ship's rudder, so that there is at all times a definite fixed relation between the movements of the rudder-actuating motor and the member of the controlling-rheostat. This transmission device consists of a synchronous motor geared to one member of the transmitting apparatus and electrically connected through a multiconductor-cable with a device which is controlled by the movements of the rudder and acts through the cable to produce a rotating polarity in the field of the synchronous motor. The synchronous motor is shown at 17 and consists of a fixed and a rotatable member, the fixed member resembling a gram-ring having a plurality of conductors leading from equally-spaced points in the length of the winding, these conductors being grouped together, so as to form a multiconductor-cable, which extends into proximity to the rudder-actuating mechanism. The rotating member of the synchronous motor consists of a direct-current field-magnet 18, excited by current derived from any suitable source—as, for example, the ship's mains 6 7. The six conductors 19 to 24, which extend from equally-spaced points in the ring 17 and which are grouped together to form the multiconductor-cable 25, are connected to equally-spaced points in a closed-circuit rheostat 26. This rheostat is connected at short intervals in its length to the segments of a commutator 27. Over this commutator sweep two diametrically-located brushes 28 and 29, connected, respectively, through collector-rings with leads 30 and 31, extending to the ship's main 6 7. The shaft carrying these diametrically-extending contacts 28 29 is geared to the shaft of the rudder by suitable gearing, (indicated conventionally at 32.)

The operation of the motor-control system may now be roughly described as follows: The operator at the transmitting mechanism first causes the movable contacts 33 34 to be moved away from their neutral position on the commutator 35, the segments of which are connected to points on the rheostat 14, as shown. The result is that an electromotive force of gradually-increasing value is impressed upon the field of the generator 12, thereby gradually building up the said field and causing the generation in the armature of this machine of an electromotive force of correspondingly-varying character, which electromotive force is impressed upon the armature of the rudder-actuating motor 1. This motor immediately starts into operation and moves the rudder away from its neutral position. This movement of the rudder, however, acting through the gearing 32, causes a corresponding movement of the arm carrying the movable contacts 28 29. The result is a corresponding shifting of polarity around the ring 26, this shifting polarity being transmitted electrically through the multiconductor-cable 25 to the fixed member 17 of the synchronous motor. The shifting polarity or "rotating" field, as it may conveniently be termed, thus causes a corresponding rotation of the movable member 18 of the synchronous motor, this rotation being synchronous with and having a definite relation to the rotation of the rudder itself. The motion of the movable member of the synchronous motor is communicated through gearing of some suitable type, such as will hereinafter be described, and causes or tends to cause a return of the contacts 33 34 to their neutral position on the commutator 35, thus gradually cutting down the generator-field. This neutral position being reached, the current supplied by the generator 12 ceases and the rudder stops.

The fact that the machine 12 is a generator is indicated by the belt and driving pulley shown in conventional diagram connected thereto.

One form of transmitting apparatus for controlling the field of the generator 12 is shown in Fig. 2. It consists of a commutator 35, secured to a suitable framework 36. The segments of this commutator are connected to two rheostats 37, corresponding to the two sections of the rheostat 14 shown in Fig. 1, the connections between the commutator and rheostats being, however, omitted in Fig. 2 for the sake of clearness of illustration. Brushes or contacts 33 34 bear upon commutator 35 and are carried by an arm 38, secured to a shaft 39, movable in bearings in the framework 36. Motion is communicated to the shaft through the coöperation of four bevel-gears, two of which, 39$^a$ and 40, are mounted upon oppositely-extending pins carried by a hub 41, keyed to said shaft. Of the other two bevel-gears one (indicated at 42) is secured to the steering-wheel 43, which is free to rotate about the said shaft. Similarly the other bevel-gear 44 is rotatable about the said shaft and is secured to a toothed gear 45, connected through an intermediate gear 46 with a shaft 47, carrying the rotating member of a synchronous motor. This rotating member is in Fig. 2 concealed behind the fixed member 48; but its construction will readily be understood by reference to its representation at 18, Fig. 1. Current is supplied to this rotating member through collector-rings 49 and coöperating brushes and leads, which for convenience are not shown. In order to limit the number of revolutions of the steering-wheel 43, and thereby limit the angle through which the rudder may be turned, I make use of a stopping device consisting of two gear-wheels, one fixed to the steering-wheel 43 and designated by the numeral 50, the other meshing therewith and indicated at 51. This latter gear-wheel is provided with a pin 52, which after a sufficient amount of rotation of the wheel comes into engagement with the teeth of the pinion 50, thereby acting as a stop and preventing any further movement of the steering-wheel.

The illustration of the transmitting apparatus in Fig. 2 shows the parts in their middle or neutral position corresponding to the middle or neutral position of the rudder. In this position of rest the movable member of the synchronous motor is held with comparative rigidity in a given position with respect to its fixed member. Under these circumstances a rotation of the steering-wheel causes a rotation of the bevel-gear 42, the bevel-gear 44 at this moment resisting any rotation by reason of its geared connection with the movable member of said synchronous motor, which thereby acts as a sort of fulcrum. The result is a forward movement of the oppositely-mounted bevel-gears 39$^a$ and 40, carried by the shaft 39. The resulting movement of this shaft causes a rotation of the contact-arm 38, carrying the contacts or brushes 33 34, which coöperate with the rheostat-commutator 35. This movement of the brushes over the segments of the commutator and away from the neutral position (indicated in diagram in Fig. 1) immediately causes an electromotive force to be impressed upon the generator, which operates the rudder-actuating motor. This motor then starts up and by means of the gearing shown at 32 in Fig. 1 shifts the points of connection of the leads 30 31 along the ring-winding of the rheostatic device 26, thereby shifting points of opposite polarity from one set of leads emanating therefrom to the next, and so on, this shifting polarity being transmitted by these leads through the multiconductor-cable 25 to the fixed member 17 of the synchronous motor. The revolving member of this motor immediately starts up and runs in synchronism with the shifting of polarity about its fixed member. The revolving member of this motor is geared, by means of the toothed gear 46, with the gear-wheel 45, which is loose on the shaft 39, but which carries the bevel-gear 44, meshing with the two revolving bevel-gears 39$^a$ and 40. The intermediate gearing referred to is so arranged as to cause bevel-gear 44 when put into operation to rotate in a direction opposite the direction of rotation of the steering-wheel 43. The effect of this rotation of the bevel-gear 44 is to return the contact-carrying arm 38 to its neutral position, the bevel-gear 42 under these circumstances being prevented by the helmsman from revolving backward, as the synchronous motor produces a reaction thereon when it starts into operation.

The figures on Sheet 2 are views more or less in detail of a different form of transmitting apparatus, the operation of which, however, is the same in function as that of the transmitting device in Fig. 2. Fig. 4 is a view of the transmitting apparatus, taken from a position facing the steering-wheel. Fig. 3 is another view of the apparatus, taken partly in cross-section along the line X Y. The steering-wheel in this modification is indicated at 53 and is fixed to a screw-threaded shaft, (shown in detail at 54 in Fig. 7 and also at 54 in Fig. 6.) This screw-threaded shaft carries a bevel-gear 55 pinned thereto, this gear meshing with a companion gear 56, mounted on the top end of a vertical transmitting-shaft extending below the deck 58, which supports the wheel-box 59. The lower end of this shaft 57 transmits motion through a pair of bevel-gears 60 to a horizontal shaft 61. This shaft carries an intermediate gear 62, which meshes with a large gear 63 on a shaft 64, which carries one of the two relatively revolving members of a rheostat, the function of which is indicated more clearly in Fig. 1. The parts of the rheostat carried by this shaft consist of two sections of resistance mounted in retaining-boxes 65 66, pinned to the shaft. The various terminals leading from these sections of resistance connect to a commutator 67, likewise pinned upon the same shaft, the connections corresponding to those indicated in Fig. 1. The other member of the rheostat consists of two contacts or brushes 68 69, movable over the segments of the commutator 67, these contacts or brushes being carried by a gear-wheel 70. (Shown in Fig. 3 and in detail in Fig. 5.) Electrical connections between these contacts or brushes and the leads extending to the field 13 of the generator (shown in Fig. 1) are secured in this case by means of collector-rings 71 and coöperating brushes. (Not shown.) In order to communicate motion to the brushes or contacts 68 69 from the movable member of the synchronous motor 72, corresponding to the synchronous motor 48 in Fig. 2, I mount upon the shaft 73 of this movable member a spur-gear 74, which meshes with the gear 70, carrying the moving brushes 68 and 69. This arrangement of parts is indicated better in Fig. 5, which represents a partial view of the transmitting apparatus, taken from a position facing the right-hand end of the view shown in Fig. 3. In this Fig. 5 the fixed member of the synchronous motor is shown at 72, the rotating member being indicated at 75, while the gear mounted upon the same shaft as the rotating member 75 is likewise indicated at 74. The gear with which the gear 74 coöperates is indicated at 70 and is the same as the gear shown at 70 in Fig. 3. The direct-current excitation of the movable member 75 of the synchronous motor is secured by transmitting current to the movable member through leads connected to coöperating brushes and collector-rings, (shown at 76,) this current being supplied from any suitable source—such, for example, as the ship's mains 6 7. The permanent electrical connection between the ship's mains 6 7 and the two sections of the rheostat 65 66 is similarly obtained through other collector-rings 77 and coöperating brushes and leads. (Not shown.) These permanent connections correspond to the connections of the leads 15 16 with the rheostat shown in Fig. 1. Sliding connections between the mains and rheostats are needed in Fig. 3, because the rheostats revolve, while in Fig. 2 no sliding connections are necessary, because the rheostats are fixed in position.

In order to indicate to the helmsman the direction and amount of movement of the rudder, I make use of an indicating device located within the presence of the helmsman and acted upon through gearing connecting with the shaft 73 of the synchronous motor. This indicating device comprises a screw-threaded shaft 78, mounted on the top of the steering-box 59, parallel and in proximity to the shaft 54. The shaft 78 is connected by bevel-gearing through the vertical shaft 79 with the shaft 73 of the synchronous motor. Upon both of the threaded shafts 54 and 78 are traversing nuts 80 81, these nuts carrying pointers moving over a scale 82. Lugs 85 86, carried by the shaft 54, engage similar lugs on the sliding nut 80, so as to limit the range of movement of the latter, and consequently the range of movement of the steering-wheel. When the steering-wheel is moved in either direction, the sliding nut 80 is moved along the scale 82, while at the same time motion is transmitted through the shaft 57 and intermediate gearing to the gear 63, mounted upon the rheostat-shaft. The commutator 67 of the rheostat is thus moved under the brushes which bear thereon, thereby transmitting a current to the driving-generator for the steering-motor, as will be clearly understood by reference to the diagram in Fig. 1. The steering-motor immediately starts into operation, thereby transmitting motion electrically to the synchronous motor in the manner already described. This motor immediately starts into operation and immediately returns or tends to return the brushes 68 and 69 to the same relative position which they previously occupied upon the rheostat-commutator 67. In doing so the rotation of the shaft 73 transmits motion through the bevel-gears 83, the upright shaft 79, and the bevel-gears 84 to the shaft 78, carrying the sliding nut 81. This nut is immediately traversed along the shaft, and the mechanical connections are arranged so that its direction of motion causes it to move toward the new position assumed by the nut 80 due to the rotation of the steering-wheel. When the relatively moving parts of the rheostat have been moved by the synchronous motor into the relative position corresponding to the relation of parts shown in Fig. 1 and conveniently known as a "steady" position, the rudder-motor ceases to rotate, thereby stopping the synchronous motor, and consequently the parts geared therewith. The gearing is such that when the steering-motor stops the sliding nut 81, driven by the synchronous motor, stops in a position opposite the sliding nut 80, driven by the steering-wheel 53. The movements of the sliding nut 81 and its position upon the scale 82 therefore serve to indicate the position of the rudder at any moment and also whether its movements have or have not caught up to those of the steering-wheel, as indicated by the movement of the sliding nut 80 driven thereby.

I do not claim, broadly, the combination, with a motor, of a controlling device for starting and stopping said motor located at a point distant therefrom, together with means for operating said device to start the motor, and electrical means arranged to move synchronously with said motor for operating said device to stop the motor, since such broad combination is not of my invention.

What I do claim as new, and desire to secure by Letters Patent of the United States, is—

1. The combination of a motor, a generator electrically connected thereto, manually-controlled means for gradually building up the field of said generator in either direction, and a synchronous electromotive device operatively connected to the said motor and arranged to operate in synchronism therewith to gradually cut down the field of the said generator.

2. The combination of a motor, a generator electrically connected thereto, manually-controlled means for supplying current to the field-winding of said generator in either direction, and a synchronous electromotive device which operates in synchronism with said motor to shut off the supply of current to the field-winding of the said generator.

3. The combination of a rheostat, a manually-controlled device for producing a relative movement of coöperating parts of the rheostat, and a synchronous-motive device acting to return the parts of the rheostat to their original relative position.

4. The combination of a motor, a generator for supplying current thereto, a rheostat for controlling the current delivered by the generator, a manually-controlled device for producing a relative movement of the coöperating parts of the rheostat, and electrical means operating synchronously with said motor and acting to return the parts of the rheostat to their original relative position.

5. The combination of a motor, a rheostat, a manually-controlled device for producing a relative movement of coöperating parts of the rheostat, and electrical means operating synchronously with said motor and acting to return the parts of the rheostat to their original relative positions.

6. In a steering apparatus, the combination of a rudder-actuating motor, a generator for supplying energy thereto, and a rheostat for the generator-field coöperatively acted on by the helmsman and by motion communicated through movement of the rudder.

7. In a steering apparatus, the combination of a rudder-actuating motor, a generator for supplying energy thereto, a rheostat for the field of the generator, manually-controlled means for operating the rheostat in one direction, and means responsive to movement of said motor for returning the parts of the rheostat to the off position.

8. The combination of a motor, a generator for supplying current thereto, a rheostat for controlling the current supplied by the generator, manually-controlled means for moving one member of the rheostat in one direction, and means responsive to movement of the motor for moving said member in the reverse direction.

9. The combination of a motor, a generator for supplying current thereto, a rheostat for controlling the current supplied by the generator, manually-controlled means for moving one member of the rheostat in one direction, and means operating synchronously with said motor for moving said member in the reverse direction.

10. In a steering apparatus, the combination of a steering-wheel, a screw-driven pointer for indicating the displacement of the steering-wheel, and a pointer for indicating the position of the rudder.

In witness whereof I have hereunto set my hand this 22d day of September, 1900.

MAXWELL W. DAY.

Witnesses:
BENJAMIN B. HULL,
FRED RUSS.